(12) United States Patent
Noh

(10) Patent No.: US 11,424,625 B2
(45) Date of Patent: Aug. 23, 2022

(54) METHOD AND SERVER FOR MANAGING MOBILE RECHARGEABLE BATTERY POOLS FOR MULTIPLE STATIONS

(71) Applicant: BLUE NETWORKS CO., LTD., Cheonan-si (KR)

(72) Inventor: Soon Yong Noh, Cheonan-si (KR)

(73) Assignee: BLUE NETWORKS CO., LTD., Cheonan-si (KR)

( * ) Notice: Subject to any disclaimer, the term of this patent is extended or adjusted under 35 U.S.C. 154(b) by 0 days.

(21) Appl. No.: 17/365,812

(22) Filed: Jul. 1, 2021

(65) Prior Publication Data

US 2022/0239117 A1 Jul. 28, 2022

(30) Foreign Application Priority Data

Jan. 25, 2021 (KR) .................. 10-2021-0010504

(51) Int. Cl.
*H02J 7/00* (2006.01)
*G06Q 10/02* (2012.01)
*G06Q 50/06* (2012.01)
*B60L 53/30* (2019.01)

(52) U.S. Cl.
CPC .......... *H02J 7/00032* (2020.01); *G06Q 10/02* (2013.01); *G06Q 50/06* (2013.01); *B60L 53/305* (2019.02); *B60L 2250/16* (2013.01); *H02J 2310/22* (2020.01); *H02J 2310/48* (2020.01); *H02J 2310/62* (2020.01)

(58) Field of Classification Search
CPC ............... H02J 7/00032; H02J 2310/22; H02J 2310/48; H02J 2310/62; G06Q 10/02; G06Q 50/06; B60L 53/305; B60L 2250/16

USPC ......................................... 320/137
See application file for complete search history.

(56) References Cited

U.S. PATENT DOCUMENTS

| 9,925,882 B2* | 3/2018 | Penilla .................. G06F 3/0362 |
| 2014/0021908 A1* | 1/2014 | McCool .................. B60L 53/36 320/108 |
| 2015/0321571 A1* | 11/2015 | Penilla .................... B60L 53/80 320/104 |

(Continued)

FOREIGN PATENT DOCUMENTS

| KR | 1020120102464 A | 9/2012 |
| KR | 1020190034341 A | 4/2019 |
| KR | 102149186 B1 | 8/2020 |

*Primary Examiner* — Richard Isla
*Assistant Examiner* — Dung V Bui
(74) *Attorney, Agent, or Firm* — Kaplan Breyer Schwarz, LLP

(57) ABSTRACT

A method and server for managing mobile rechargeable battery pools of multiple stations, comprising steps of: (a) in a response to a selection of a specific location, the management server displaying pieces of location information on the stations by referring to a current location of the specific user and the specific location; (b) in a response to a selection of a k-th station among the stations, the management server displaying (i) information on (k_1)-st mobile rechargeable batteries available at a current time and (ii) information on (k_2)-nd mobile rechargeable batteries available at an estimated arrival time; and (c) in a response to a selection of a specific k-th mobile rechargeable battery, by the user device for a future need, the management server sending information on the future need to an administrator device or a provider device.

6 Claims, 4 Drawing Sheets

(56) References Cited

U.S. PATENT DOCUMENTS

| | | | |
|---|---|---|---|
| 2018/0015835 A1* | 1/2018 | Penilla | G06Q 30/0226 |
| 2018/0253788 A1* | 9/2018 | Takatsuka | G06Q 30/06 |
| 2018/0281612 A1* | 10/2018 | Perry | B60L 53/63 |
| 2019/0137278 A1* | 5/2019 | Sakuma | G01C 21/20 |
| 2019/0383637 A1* | 12/2019 | Teske | G01C 21/3682 |
| 2020/0386561 A1* | 12/2020 | Namiki | G06Q 30/0645 |
| 2021/0001744 A1* | 1/2021 | Suzuki | B60L 53/62 |

* cited by examiner

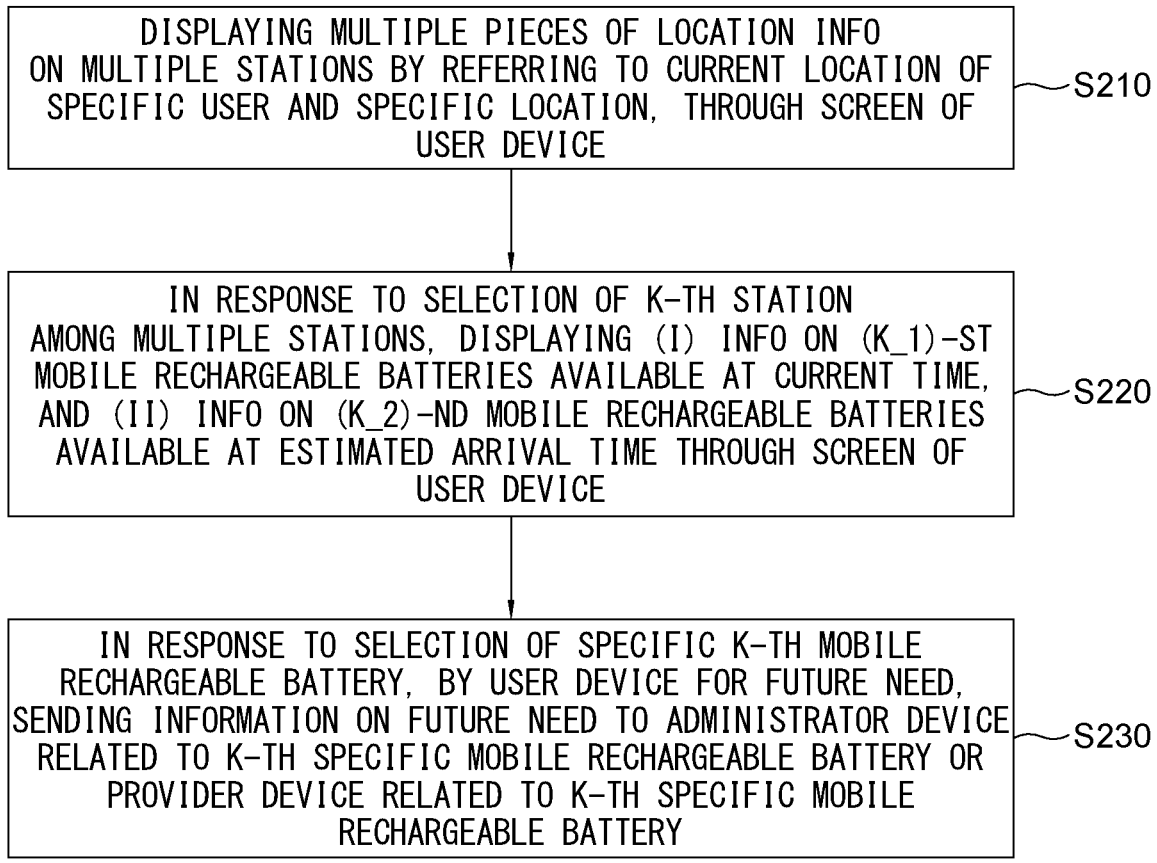

FIG. 3B

CURRENT TIME 1:00 P.M.

| | AVAILABLE MOBILE RECHARGEABLE BATTERIES | REMAINING CAPACITIES | RESERVATION STATUS |
|---|---|---|---|
| CHEONAN STATION | 2ND MOBILE RECHARGEABLE BATTERY | 5kWh | – |
| | 5TH MOBILE RECHARGEABLE BATTERY | 10kWh | 1:30 P.M. ~ 1:50 P.M. |
| | ⋮ | ⋮ | ⋮ |
| | 11TH MOBILE RECHARGEABLE BATTERY | 7kWh | 2:05 P.M. ~ 2:15 P.M. |

ESTIMATED ARRIVAL TIME 2:10 P.M.

| | AVAILABLE MOBILE RECHARGEABLE BATTERIES (ESTIMATED) | REMAINING CAPACITIES (ESTIMATED) | RESERVATION STATUS |
|---|---|---|---|
| CHEONAN STATION | 1ST MOBILE RECHARGEABLE BATTERY | 8kWh | 2:15 P.M. ~ 2:25 P.M. |
| | 6TH MOBILE RECHARGEABLE BATTERY | 7kWh | – |
| | ⋮ | ⋮ | ⋮ |
| | 15TH MOBILE RECHARGEABLE BATTERY | 5kWh | – |

METHOD AND SERVER FOR MANAGING MOBILE RECHARGEABLE BATTERY POOLS FOR MULTIPLE STATIONS

FIELD OF THE DISCLOSURE

The present disclosure relates to a method and a server for managing mobile rechargeable battery pools of multiple stations.

BACKGROUND OF THE DISCLOSURE

In recent years, the supply of electric vehicles has been rising all over the world. In Korea, as part of the Post-2020 Greenhouse Gas Reduction Plan, it aims to remove diesel cars entirely by 2030 and supply 240,000 electric vehicles by 2020; and charging infrastructure such as charging stations to charge these electric vehicles is also being created.

Consequently, in addition to research and development on electric vehicles, various researches and developments on electric vehicle charging systems are also being carried out; moreover, a research on exchangeable charging systems for providing detachable batteries (such as U.S. Pat. No. 9,925,882) is constantly being carried out.

Therefore, there is a need to provide not only a charging service with the existing charging modules of electric vehicles but also another charging service with the detachable batteries. Further, there is a need to develop a method for managing such detachable batteries.

SUMMARY OF THE DISCLOSURE

It is an object of the present disclosure to solve all of the aforementioned problems.

It is another object of the present disclosure to not only provide information on stations capable of providing mobile rechargeable batteries to a user but also provide information on available mobile rechargeable batteries to the user.

It is still another object of the present disclosure to not only provide information on the available mobile rechargeable batteries at a current time to the user but also provide information on the available mobile rechargeable batteries at an estimated arrival time when the user is expected to arrive at the station.

In order to achieve the above objects and achieve the desired results that will be introduced hereinafter, the configuration of the present invention is as follows:

In accordance to one aspect of the present disclosure, there is provided a method for managing mobile rechargeable battery pools of multiple stations, wherein information on the multiple stations in which respective mobile rechargeable batteries are provided and information on each of the mobile rechargeable battery pools corresponding to each of the respective multiple stations have been managed by a management server, including steps of: (a) in response to a selection of a specific location by a user device of a specific user corresponding to a specific electric vehicle, the management server performing or supporting another device to perform a process of displaying multiple pieces of location information on the multiple stations, which are determined by referring to a current location of the specific user and the specific location, through a screen of the user device; (b) in response to a selection of a k-th station among the multiple stations by the user device, the management server performing or supporting another device to perform a process of displaying (i) information on at least one or more available (k_1)-st mobile rechargeable batteries, included in a k-th mobile rechargeable battery pool corresponding to the k-th station, at a current time when the k-th station is selected by the user device, and (ii) information on at least one or more available (k_2)-nd mobile rechargeable batteries, included in the k-th mobile rechargeable battery pool corresponding to the k-th station, at an estimated arrival time when the specific user is expected to arrive at the k-th station, through the screen of the user device; and (c) in response to a selection of a specific k-th mobile rechargeable battery, by the user device for a future need, among a plurality of mobile rechargeable batteries included in at least one of the information on the (k_1)-st mobile rechargeable batteries and the information on the (k_2)-nd mobile rechargeable batteries, the management server performing or supporting another device to perform a process of sending information on the future need to an administrator device related to the k-th specific mobile rechargeable battery or a provider device related to the k-th specific mobile rechargeable battery.

As one example, at the step of (b), (b1) in response to a cardinal number of the (k_1)-st mobile rechargeable batteries at the current time or a cardinal number of the (k_2)-nd mobile rechargeable batteries at the estimated arrival time being determined as larger than a predetermined number, the management server selects at least part of the information on the (k_1)-st mobile rechargeable batteries at the current time and the information on the (k_2)-nd mobile rechargeable batteries at the estimated arrival time from the k-th mobile rechargeable battery pool corresponding to the k-th station, and (b2) in response to a cardinal number of the (k_1)-st mobile rechargeable batteries at the current time or a cardinal number of the (k_2)-nd mobile rechargeable batteries at the estimated arrival time being determined as less than or equal to the predetermined number, the management server adds another specific mobile rechargeable battery, which is selected among other mobile rechargeable batteries included in other mobile rechargeable battery pools corresponding to other stations by determining that an expected location of said another specific mobile rechargeable battery at the current time or at the estimated arrival time is within a predetermined critical distance from the k-th station, into the k-th mobile rechargeable battery pool.

As one example, on condition that said another specific mobile rechargeable battery has been reserved by the specific user by referring to the estimated arrival time and then the specific user has arrived at the k-th station at the estimated arrival time without cancelling a reservation of said another specific mobile rechargeable battery, (i) in response to a detection that said another specific mobile rechargeable battery cannot be provided to the specific user, the management server decreases a reliability of the said another specific mobile rechargeable battery or a reliability of a provider of said another specific mobile rechargeable battery, and (ii) in response to a detection that said another specific mobile rechargeable battery can be provided to the specific user, the management server increases the reliability of said another specific mobile rechargeable battery or the reliability of the provider of said another specific mobile rechargeable battery.

As one example, the method further includes a step of: (d) in response to a detection that a charged capacity of the k-th specific mobile rechargeable battery is less than a charged capacity required for the specific electric vehicle to arrive at the specific location, the management server performing or supporting another device to perform (i) a process of calculating (k+1)-th expected arrival time to (k+n)-th expected arrival time for the specific user to arrive at a (k+1)-th station to a (k+n)-th station respectively, wherein the (k+1)-th station to the (k+n)-th station are located between the k-th station and the specific location, (ii) a process of retrieving information on a (k+1)-th specific mobile rechargeable battery to information on a (k+n)-th specific mobile rechargeable battery included in a (k+1)-th mobile rechargeable battery pool corresponding to the (k+1)-th station to a (k+n)-th mobile rechargeable battery pool corresponding to the (k+n)-th station respectively, by referring to the (k+1)-th expected arrival time to the (k+n)-th expected arrival time, and (iii) a process of displaying the information on the (k+1)-th specific mobile rechargeable battery to the information on the (k+n)-th specific mobile rechargeable battery through the screen of the user device.

As one example, at the step of (b), the information on the (k_1)-st mobile rechargeable batteries includes at least one of (i) information on remaining capacities of the (k_1)-st mobile rechargeable batteries at the current time and (ii) information on first reservations of (k_1)-st mobile rechargeable batteries made by first other users, and wherein the information on the (k_2)-nd mobile rechargeable batteries includes at least one of (i) information on remaining capacities of the (k_2)-nd mobile rechargeable batteries at the estimated arrival time and (ii) information on second reservations of (k_2)-nd mobile rechargeable batteries made by second other users after the estimated arrival time.

In accordance with another aspect of the present disclosure, there is provided a management server for managing mobile rechargeable battery pools of multiple stations, wherein, information on the multiple stations in which respective mobile rechargeable batteries are provided and information on each of the mobile rechargeable battery pools corresponding to each of the respective multiple stations have been managed by the management server, including: at least one memory that stores instructions; and at least one processor configured to execute the instructions to perform or support another device to perform: (I) in response to a selection of a specific location by a user device of a specific user corresponding to a specific electric vehicle, a process of displaying multiple pieces of location information on the multiple stations, which are determined by referring to a current location of the specific user and the specific location, through a screen of the user device, (II) in response to a selection of a k-th station among the multiple stations by the user device, a process of displaying (i) information on at least one or more available (k_1)-st mobile rechargeable batteries, included in a k-th mobile rechargeable battery pool corresponding to the k-th station, at a current time when the k-th station is selected by the user device, and (ii) information on at least one or more available (k_2)-nd mobile rechargeable batteries, included in the k-th mobile rechargeable battery pool corresponding to the k-th station, at an estimated arrival time when the specific user is expected to arrive at the k-th station, through the screen of the user device, and (III) in response to a selection of a specific k-th mobile rechargeable battery, by the user device for a future need, among a plurality of mobile rechargeable batteries included in at least one of the information on the (k_1)-st mobile rechargeable batteries and the information on the (k_2)-nd mobile rechargeable batteries, a process of sending information on the future need to an administrator device related to the k-th specific mobile rechargeable battery or a provider device related to the k-th specific mobile rechargeable battery.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 2 is a drawing schematically illustrating a sequence diagram of a method for managing the mobile rechargeable battery pools of the multiple stations in accordance with one example embodiment of the present disclosure.

FIG. 3A and FIG. 3B are drawings explaining the method for managing the mobile rechargeable battery pools of the multiple stations in accordance with one example embodiment of the present disclosure.

DETAILED DESCRIPTION OF THE PREFERRED EMBODIMENTS

Figure 1:
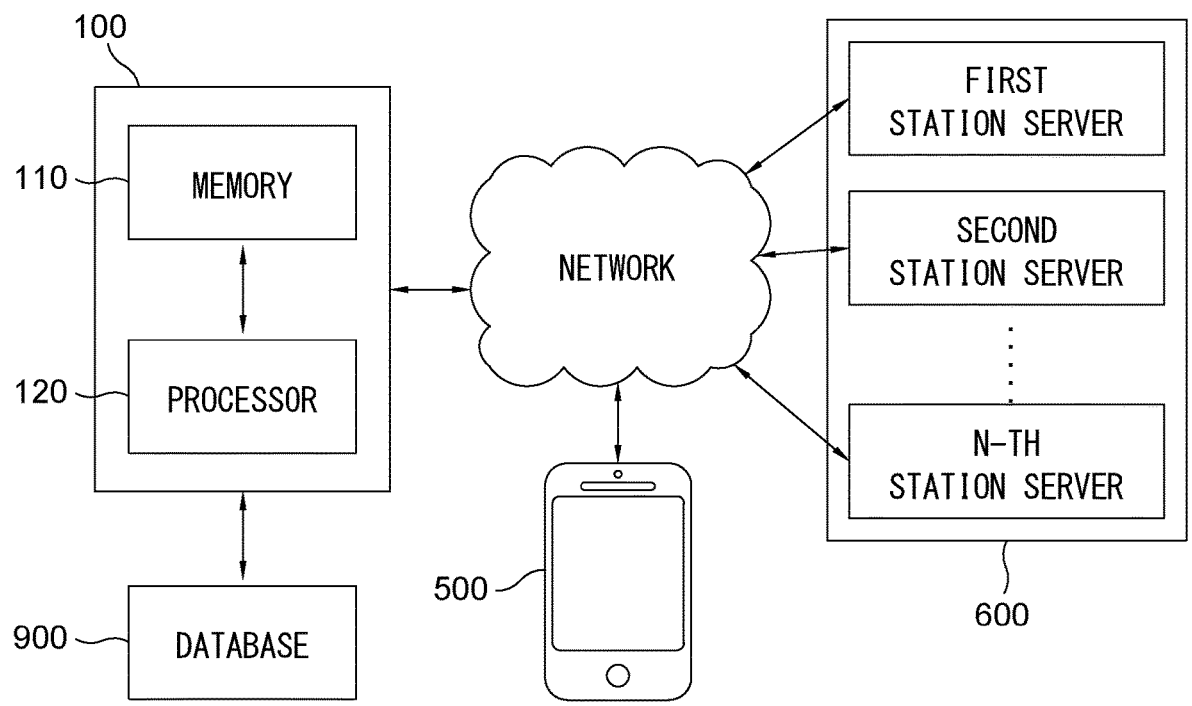
FIG. 1 is a drawing schematically illustrating an overall configuration of a management server for managing mobile rechargeable battery pools of multiple stations in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating an overall configuration of a management server 100 for managing mobile rechargeable battery pools of multiple stations in accordance with one example embodiment of the present disclosure.

As shown in FIG. 1, the management server 100 that manages the mobile rechargeable battery pools for the multiple stations may include a memory 110 and a processor 120.

The memory 110 of the management server 100 may store instructions of the processor 120, wherein the instructions are specifically codes generated for the purpose of allowing the management server 100 to function in a specific manner, and can be implemented in a form of executable program command through a variety of computer means recordable to computer readable media. The instructions may execute processes for performing functions described herein.

Furthermore, the processor 120 of the management server 100 may include hardware configurations such as an MPU (Micro Processing Unit) or a CPU (Central Processing Unit), cache memory, and data bus, etc. It may further include an operating system, and software that perform specific functions.

Also, the management server 100 that manages the mobile rechargeable battery pools of the multiple stations can be communicated with a database 900. Herein, the database 900 may include at least one storage medium of flash memory type, hard disk type, multimedia card micro type (for example, SD or XD memory), RAM (Random Access Memory), SRAM (Static Random Access Memory), ROM (Read Only Memory), EEPROM (Electrically Erasable Programmable Read Only Memory), PROM (Programmable Read Only Memory), magnetic memory, magnetic disk, optical disk, but it is not limited thereto, and may include any medium capable of storing data. Moreover, depending on the operating condition of the present disclosure, the database 900 may be installed separately from the management server 100, or may be installed within the management server 100 to transmit and record data, and may also be implemented separately into two or more DBs, contrary to the illustration.

Additionally, the management server 100 can transmit and receive necessary information to and from a user device 500 via a communication unit (not illustrated).

Moreover, the management server 100 may transmit and receive necessary information to and from respective station servers 600 corresponding to respective stations that provide mobile rechargeable batteries via the communication unit (not illustrated). Herein, the mobile rechargeable battery may be attached to and detached from an interior or an exterior of an electric vehicle, and can be connected to the electric vehicle to charge a battery of the electric vehicle. Also, the mobile rechargeable battery may be used when the electric vehicle is parked or stopped at a station or while the electric vehicle is moving. Herein, the management server 100 and station servers 600 may be configured as a single server or may be configured as separate servers. The method described hereinafter assumes that the management server 100 and the station servers 600 as separate servers.

The management server 100 can register the mobile rechargeable battery pools, which are generated by grouping information on the mobile rechargeable batteries according to their corresponding stations, into the database 900. Herein, the information on the mobile rechargeable batteries are received from each of the corresponding station servers 600. Further, if necessary, some of the mobile rechargeable batteries which have been belonging to their corresponding mobile rechargeable battery pools may be added into at least one of other mobile rechargeable battery pools. That is, a specific mobile rechargeable battery can be returned to a specific station where the specific mobile rechargeable battery has been belonging, or if necessary, the specific mobile rechargeable battery may be returned to another station.

Furthermore, the management server 100 may transmit and receive necessary information to and from other user devices (not illustrated) via the communication unit (not illustrated).

The method of managing the mobile rechargeable battery pools of the multiple stations in accordance with one example embodiment of the present disclosure, which follows the above configuration, is explained below in detail by referring to FIG. 2.

FIG. 2 is a diagram that schematically illustrates a brief sequence of the method for managing the mobile rechargeable battery pools of the multiple stations in accordance with one example embodiment of the present disclosure.

First, in response to a selection of a specific location by the user device 500 of a specific user corresponding to a specific electric vehicle, the management server 100 performs or supports another device to perform a process of displaying multiple pieces of location information on the multiple stations, which are determined by referring to a current location of the specific user and the specific location, through a screen of the user device, at a step of S210.

Herein, the specific location (for instance, a destination location) may be a location the specific user inputted through a keypad on the user device 500, or may be a location chosen by the specific user among the multiple stations displayed on the user device 500, but it is not limited thereto.

Also, the locations of the multiple stations may be located between the current location and the specific location or located on a path of the specific electric vehicle from the current location to the specific location, but they are not limited thereto. Herein, the stations may provide, without limitation, the mobile rechargeable batteries, electric vehicle charging services, and a variety of amenities such as convenience store, restaurant, café etc.

Further, in response to a selection of a k-th station among the multiple stations by the user device 500, the management server 100 performs or supports another device to perform a process of displaying (i) information on at least one or more available (k_1)-st mobile rechargeable batteries, included in a k-th mobile rechargeable battery pool corresponding to the k-th station, at a current time when the k-th station is selected by the user device, and (ii) information on at least one or more available (k_2)-nd mobile rechargeable batteries, included in the k-th mobile rechargeable battery pool corresponding to the k-th station, at an estimated arrival time when the specific user is expected to arrive at the k-th station, through the screen of the user device 500, at a step of S220.

Specifically, by providing the information on mobile rechargeable batteries available at the current time to the specific user, the specific user may reserve at least one of the mobile rechargeable batteries for use in advance to avoid an embarrassing situation where all the mobile rechargeable batteries are unavailable when the specific user arrives at the k-th station, e.g., all the mobile rechargeable batteries are in use or have been reserved by other users while the specific user was travelling to the k-th station. Herein, there may be additional fees depending on the time it takes for the specific user to arrive at the k-th station, which will be explained later in detail. Also, by providing information on available mobile rechargeable batteries at the estimated arrival time, the specific user can check information on immediately available mobile rechargeable batteries on the basis of the estimated arrival time, and by referring to such information, the specific user may reserve at least one of the immediately available mobile rechargeable batteries for use and receive efficient charging service without wasting time.

Herein, (i) in response to a cardinal number of the (k_1)-st mobile rechargeable batteries at the current time or a cardinal number of the (k_2)-nd mobile rechargeable batteries at the estimated arrival time being determined as larger than a predetermined number, the management server 100 selects at least part of the information on the (k_1)-st mobile rechargeable batteries at the current time and the information on the (k_2)-nd mobile rechargeable batteries at the estimated arrival time from the k-th mobile rechargeable battery pool corresponding to the k-th station, and (ii) in response to a cardinal number of the (k_1)-st mobile rechargeable batteries at the current time or a cardinal number of the (k_2)-nd mobile rechargeable batteries at the estimated arrival time being determined as less than or equal to the predetermined number, the management server 100 adds another specific mobile rechargeable battery, which is selected among other mobile rechargeable batteries included in other mobile rechargeable battery pools corresponding to other stations by determining that an expected location (a location where a vehicle equipped with the said another specific mobile rechargeable battery is expected to travel pass) of said another specific mobile rechargeable battery at the current time or at the estimated arrival time is within a predetermined critical distance from the k-th station, into the k-th mobile rechargeable battery pool.

For example, if the information on the available mobile rechargeable batteries included in the k-th battery pool at the current time or the estimated arrival time cannot be provided to the specific user since there are no such available batteries, in case at least some of h-th mobile rechargeable batteries and m-th mobile rechargeable batteries, respectively belonging to an h-th mobile rechargeable battery pool and an m-th mobile rechargeable battery pool, are expected to be located within the predetermined critical distance from the k-th station at the current time or the estimated arrival time, the management server 100 may assign said at least some of the h-th mobile rechargeable batteries and the m-th mobile rechargeable batteries to the k-th mobile rechargeable battery pool, and may provide the information on said at least some of the h-th mobile rechargeable batteries and the m-th mobile rechargeable batteries to the specific user. Herein, after said at least some of the h-th mobile batteries and the m-th mobile rechargeable batteries are used by the specific user, said at least some of the h-th mobile batteries and the m-th mobile rechargeable batteries may be returned to the k-th mobile rechargeable battery pool, but they are not limited thereto.

In addition, on condition that said another specific mobile rechargeable battery has been reserved by the specific user on the basis of the estimated arrival time and then the specific user has arrived at the k-th station at the estimated arrival time without cancelling a reservation of said another specific mobile rechargeable battery, (i) in response to a detection that said another specific mobile rechargeable battery cannot be provided to the specific user, the management server 100 decreases a reliability of the said another specific mobile rechargeable battery or a reliability of a provider of said another specific mobile rechargeable battery, and (ii) in response to a detection that said another specific mobile rechargeable battery can be provided to the specific user, the management server increases the reliability of said another specific mobile rechargeable battery or the reliability of the provider of said another specific mobile rechargeable battery.

For example, if a detection that said another specific mobile rechargeable battery cannot be provided to the specific user although the specific user reserved said another specific mobile rechargeable battery for use and arrived at the k-th station at the estimated arrival time, it may represent that the provider of the said another specific mobile rechargeable battery has not arrived at the k-th station at or before the estimated arrival time, or has arrived late, therefore, as a form of disincentive, the reliability of the provider of said another specific mobile rechargeable battery is allowed to be decreased. Herein, as an additional disincentive, points or mileages of the provider may be deducted or a predetermined fine may be charged; for instance, if the provider arrived late, then the amount of deducted points or mileages or rates of fines can vary depending on how late the provider arrived, but it is not limited thereto. Otherwise, a detection that said another specific mobile rechargeable battery is provided to the user on condition that the specific user has reserved said another specific mobile rechargeable battery for use and has arrived at the k-th station at the estimated arrival time, it may represent that the provider of the said another specific mobile rechargeable battery has arrived at the k-th station on or before the estimated arrival time, therefore, as a form of incentive, the management server 100 may increase the reliability of the provider of said another specific mobile rechargeable battery. Herein, as an additional incentive, a predetermined amount of points or mileages may be rewarded, but it is not limited thereto.

Further, the information on the (k_1)-st mobile rechargeable batteries includes at least one of (i) information on remaining capacities of the (k_1)-st mobile rechargeable batteries at the current time and (ii) information on first reservations of (k_1)-st mobile rechargeable batteries made by first other users, and the information on the (k_2)-nd mobile rechargeable batteries includes at least one of (i) information on remaining capacities of the (k_2)-nd mobile rechargeable batteries at the estimated arrival time and (ii) information on second reservations of (k_2)-nd mobile rechargeable batteries made by second other users after the estimated arrival time.

That is, it is possible for the specific user to not only check the information on the remaining capacity of at least one of the mobile rechargeable batteries available at the current time or the estimated arrival time but also check the information on the reservations of the mobile rechargeable batteries that have been previously made by other users, to thereby allow the specific user to reserve or use one of the mobile rechargeable batteries.

Furthermore, the management server 100 can additionally provide at least one (k_3)-rd mobile rechargeable battery to the user device 500. Herein the (k_3)-rd mobile rechargeable battery, corresponding to the k-th station, represents at least one battery available within a predetermined critical time after the current time or the estimated arrival time though unavailable at the current time or the estimated arrival time.

Subsequently, in response to a selection of a specific k-th mobile rechargeable battery, by the user device for a future need, among a plurality of mobile rechargeable batteries included in at least one of the information on the (k_1)-st mobile rechargeable batteries and the information on the (k_2)-nd mobile rechargeable batteries, the management server 100 performs or supports another device to perform a process of sending information on the future need to an administrator device related to the k-th specific mobile rechargeable battery or a provider device related to the k-th specific mobile rechargeable battery, at a step of S230.

Herein, the information on the future need may include at least one of (i) information on a specific reservation time, which is the information on when the specific user intends to use the k-th specific battery, (ii) information on a specific usage fee, which is the information on usage fee corresponding to the specific reservation time, and (iii) information on a specific prepayment, which is the information on whether a prepayment of the specific usage fee was made.

Also, the information on the specific usage fee may be determined according to the fee information corresponding to a time duration from the current time to the specific reservation time. Herein, the information on fees may be determined differently for each range of time intervals, which are divided into sections for each of the predetermined time intervals. As an example, the rate of fee increase may not be linear, and a more weighted fee may be applied, such as 1,000 KRW for 1-10 minutes, 2,000 KRW for 11-20 minutes, 4,000 KRW for 21-30 minutes, and 8,000 KRW for 31-40 minutes, but it is not limited thereto.

An example embodiment of the method for managing the mobile rechargeable battery pools of the multiple stations as described above will be described below by referring to FIG. 3A and FIG. 3B.

Figure 3A:
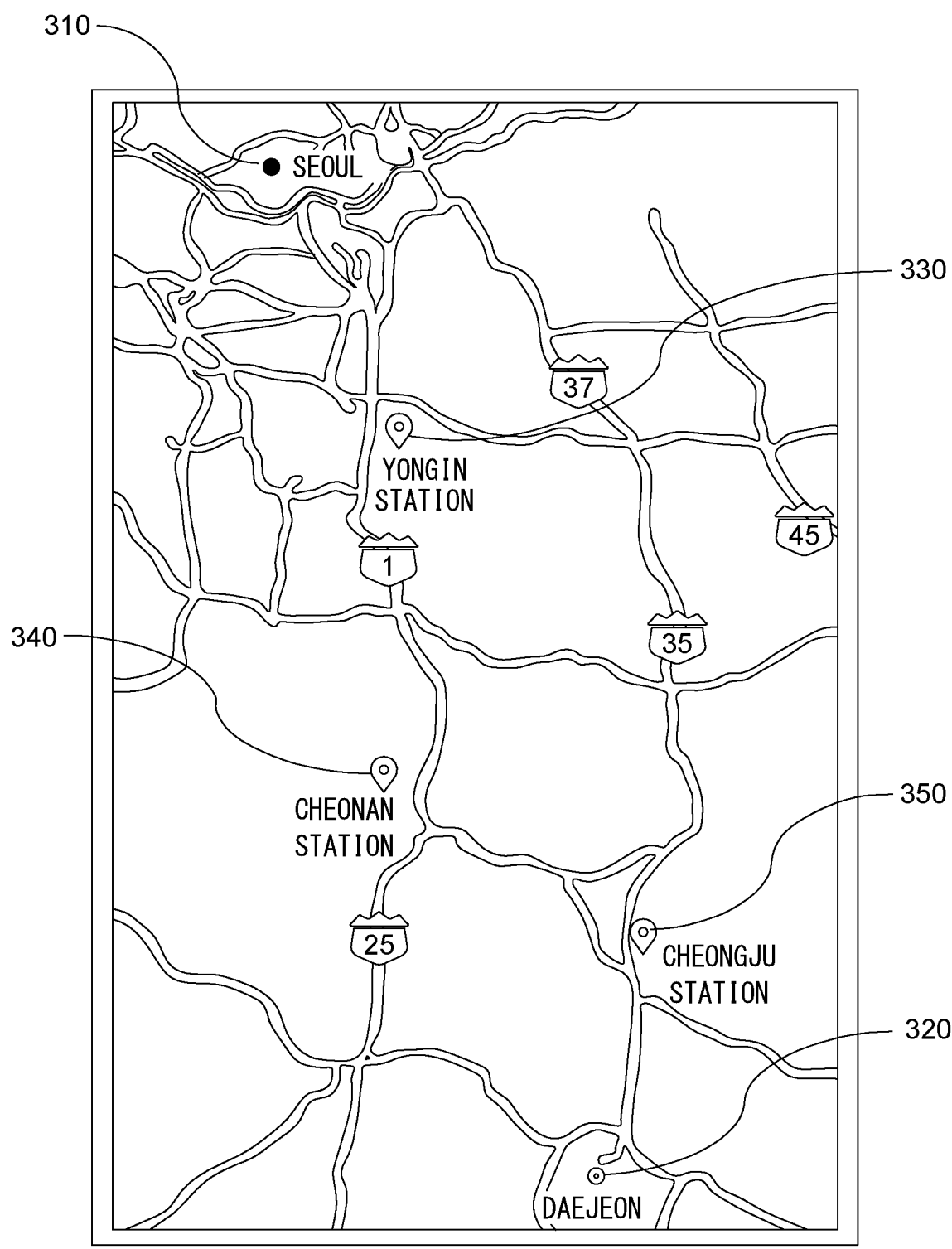

Referring to FIG. 3A, if the current location of the specific user is Seoul 310 and the specific location of the specific user is Daejeon 320, then locations of respective Yongin station 330, Cheonan station 340, and Cheongju station 350, which are the multiple stations in between Seoul 310 and Daejeon 320, are displayed through the screen of the user device 500.

Moreover, if it is assumed that the specific user selects the Cheonan station 340 at 1:00 PM, a screen as shown in FIG. 3B may be displayed through the screen of the user device 500.

Specifically, the user terminal 500 displays the current time 360 and the estimated arrival time 370 to Cheonan station 340 separately and the Cheonan 1 mobile rechargeable battery list 361 available at the current time 360 and the Cheonan 2 mobile rechargeable battery list 371 available at the estimated arrival time 370 are displayed, respectively.

In addition, (i) information on remaining capacities 362 of respective batteries included in the Cheonan 1 mobile rechargeable battery list 361 and (ii) information on first reservations 363 of the respective batteries included in Cheonan 1 mobile rechargeable battery list 361 are further displayed, and (i) information on estimated remaining capacities 372 of respective batteries included in the Cheonan 2 mobile rechargeable battery list 371 and (ii) information on second reservations 373 of respective batteries included in Cheonan 2 mobile rechargeable battery list 371 are further displayed.

Therefore, the specific user may check the information displayed as shown in FIG. 3B and determine whether to reserve at least one of the mobile rechargeable batteries, and determine a duration of use for the at least one of the mobile rechargeable batteries.

On the other hand, the steps S210 to S230 are essential to the present invention, but may further include a following step after the steps S210 to S230.

At a step of S240, in response to a detection that a charged capacity of the k-th specific mobile rechargeable battery is less than a charged capacity required for the specific electric vehicle to arrive at the specific location, the management server 100 performs or supports another device to perform (i) a process of calculating (k+1)-th expected arrival time to (k+n)-th expected arrival time for the specific user to arrive at a (k+1)-th station to a (k+n)-th station respectively, wherein the (k+1)-th station to the (k+n)-th station are located between the k-th station and the specific location, (ii) a process of retrieving information on a (k+1)-th specific mobile rechargeable battery to information on a (k+n)-th specific mobile rechargeable battery included in a (k+1)-th mobile rechargeable battery pool corresponding to the (k+1)-th station to a (k+n)-th mobile rechargeable battery pool corresponding to the (k+n)-th station respectively, by referring to the (k+1)-th expected arrival time to the (k+n)-th expected arrival time, and (iii) a process of displaying the information on the (k+1)-th specific mobile rechargeable battery to the information on the (k+n)-th specific mobile rechargeable battery through the screen of the user device.

As an example, if the location of k-th station is Daejeon and the charged capacity of the k-th specific mobile rechargeable battery is 10 kWh, but to arrive at the specific location of Pusan decided by the specific user requires a charged capacity of 25 kWh and the current remaining charged capacity of the specific electric vehicle is 10 kWh, then the charged capacity, i.e., 10 kWh, of the k-th specific mobile rechargeable battery is less than the required charged capacity for the specific electric vehicle to arrive at Pusan, therefore, information on mobile rechargeable batteries retrieved by referring to a location of a station, e.g., Daegu station, in between Daejeon and Pusan and its corresponding estimated arrival time is provided to the specific user to allow the specific user to be able to charge, at the Daegu station, the additionally required capacity for the specific electric vehicle to arrive at Pusan.

The present disclosure has an effect of not only providing information on stations capable of managing a plurality of mobile rechargeable batteries to users but also providing information on the available mobile rechargeable batteries.

The present disclosure has another effect of not only providing information on the available mobile rechargeable batteries at the current time to the specific user but also providing information on the available mobile rechargeable batteries at the estimated arrival time to the specific user.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for managing mobile rechargeable battery pools of multiple stations, wherein information on the multiple stations in which respective mobile rechargeable batteries are provided and information on each of the mobile rechargeable battery pools corresponding to each of the respective multiple stations have been managed by a management server, comprising steps of:
   (a) in response to a selection of a specific location by a user device of a specific user corresponding to a specific electric vehicle, the management server performing or supporting another device to perform a process of displaying multiple pieces of location information on the multiple stations, which are determined by referring to a current location of the specific user and the specific location, through a screen of the user device;
   (b) in response to a selection of a k-th station among the multiple stations by the user device, the management server performing or supporting another device to perform a process of displaying (i) information on at least one or more available (k_1)-st mobile rechargeable batteries, included in a k-th mobile rechargeable battery pool corresponding to the k-th station, at a current time when the k-th station is selected by the user device, and (ii) information on at least one or more available (k_2)-nd mobile rechargeable batteries, included in the k-th mobile rechargeable battery pool corresponding to the k-th station, at an estimated arrival time when the specific user is expected to arrive at the k-th station, wherein at least one of the one or more available (k_2)-nd mobile rechargeable batteries is not in the k-th mobile rechargeable battery pool at the current time but is expected to be at in the k-th mobile rechargeable battery pool at the estimated arrival time; and
   (c) in response to a selection of a specific k-th mobile rechargeable battery, by the user device for a future need, among a plurality of mobile rechargeable batteries included in at least one of the information on the (k_1)-st mobile rechargeable batteries and the information on the (k_2)-nd mobile rechargeable batteries, the management server performing or supporting another device to perform a process of sending information on the future need to an administrator device related to the k-th specific mobile rechargeable battery or a provider device related to the k-th specific mobile rechargeable battery.

2. The method of claim 1, wherein, at the step of (b), (b1) in response to a cardinal number of the (k_1)-st mobile rechargeable batteries at the current time or a cardinal number of the (k_2)-nd mobile rechargeable batteries at the estimated arrival time being determined as larger than a predetermined number, the management server selects at least part of the information on the (k_1)-st mobile rechargeable batteries at the current time and the information on the (k_2)-nd mobile rechargeable batteries at the estimated arrival time from the k-th mobile rechargeable battery pool corresponding to the k-th station, and (b2) in response to a cardinal number of the (k_1)-st mobile rechargeable batteries at the current time or a cardinal number of the (k_2)-nd mobile rechargeable batteries at the estimated arrival time being determined as less than or equal to the predetermined number, the management server adds another specific mobile rechargeable battery, which is selected among other mobile rechargeable batteries included in other mobile rechargeable battery pools corresponding to other stations by determining that an expected location of said another specific mobile rechargeable battery at the current time or at the estimated arrival time is within a predetermined critical distance from the k-th station, into the k-th mobile rechargeable battery pool.

3. The method of claim 2, wherein, on condition that said another specific mobile rechargeable battery has been reserved by the specific user by referring to the estimated arrival time and then the specific user has arrived at the k-th station at the estimated arrival time without cancelling a reservation of said another specific mobile rechargeable battery, (i) in response to a detection that said another specific mobile rechargeable battery cannot be provided to the specific user, the management server decreases a reliability of the said another specific mobile rechargeable battery or a reliability of a provider of said another specific mobile rechargeable battery, and (ii) in response to a detection that said another specific mobile rechargeable battery can be provided to the specific user, the management server increases the reliability of said another specific mobile rechargeable battery or the reliability of the provider of said another specific mobile rechargeable battery.

4. The method of claim 1, further comprising a step of:
   (d) in response to a detection that a charged capacity of the k-th specific mobile rechargeable battery is less than a charged capacity required for the specific electric vehicle to arrive at the specific location, the management server performing or supporting another device to perform (i) a process of calculating (k+1)-th expected arrival time to (k+n)-th expected arrival time for the specific user to arrive at a (k+1)-th station to a (k+n)-th station respectively, wherein the (k+1)-th station to the (k+n)-th station are located between the k-th station and the specific location, (ii) a process of retrieving information on a (k+1)-th specific mobile rechargeable battery to information on a (k+n)-th specific mobile rechargeable battery included in a (k+1)-th mobile rechargeable battery pool corresponding to the (k+1)-th station to a (k+n)-th mobile rechargeable battery pool corresponding to the (k+n)-th station respectively, by referring to the (k+1)-th expected arrival time to the (k+n)-th expected arrival time, and (iii) a process of displaying the information on the (k+1)-th specific mobile rechargeable battery to the information on the (k+n)-th specific mobile rechargeable battery through the screen of the user device.

5. The method of claim 1, wherein, at the step of (b), the information on the (k_1)-st mobile rechargeable batteries includes at least one of (i) information on remaining capacities of the (k_1)-st mobile rechargeable batteries at the current time and (ii) information on first reservations of (k_1)-st mobile rechargeable batteries made by first other users, and wherein the information on the (k_2)-nd mobile rechargeable batteries includes at least one of (i) information on remaining capacities of the (k_2)-nd mobile rechargeable batteries at the estimated arrival time and (ii) information on second reservations of (k_2)-nd mobile rechargeable batteries made by second other users after the estimated arrival time.

6. A management server for managing mobile rechargeable battery pools of multiple stations, wherein, information on the multiple stations in which respective mobile rechargeable batteries are provided and information on each of the mobile rechargeable battery pools corresponding to each of the respective multiple stations have been managed by the management server, comprising:

at least one memory that stores instructions; and at least one processor configured to execute the instructions to perform or support another device to perform: (I) in response to a selection of a specific location by a user device of a specific user corresponding to a specific electric vehicle, a process of displaying multiple pieces of location information on the multiple stations, which are determined by referring to a current location of the specific user and the specific location, through a screen of the user device, (II) in response to a selection of a k-th station among the multiple stations by the user device, a process of displaying (i) information on at least one or more available (k_1)-st mobile rechargeable batteries, included in a k-th mobile rechargeable battery pool corresponding to the k-th station, at a current time when the k-th station is selected by the user device, and (ii) information on at least one or more available (k_2)-nd mobile rechargeable batteries, included in the k-th mobile rechargeable battery pool corresponding to the k-th station, at an estimated arrival time when the specific user is expected to arrive at the k-th station, wherein at least one of the one or more available (k_2)-nd mobile rechargeable batteries is not in the k-th mobile rechargeable battery pool at the current time but is expected to be at in the k-th mobile rechargeable battery pool at the estimated arrival time, and (III) in response to a selection of a specific k-th mobile rechargeable battery, by the user device for a future need, among a plurality of mobile rechargeable batteries included in at least one of the information on the (k_1)-st mobile rechargeable batteries and the information on the (k_2)-nd mobile rechargeable batteries, a process of sending information on the future need to an administrator device related to the k-th specific mobile rechargeable battery or a provider device related to the k-th specific mobile rechargeable battery.

* * * * *